United States Patent
Kim

(10) Patent No.: US 6,207,793 B1
(45) Date of Patent: Mar. 27, 2001

(54) PROCESS FOR PRODUCTION OF POLYTETRAMETHYLENE-ETHER-GLYCOL-DIESTER USING HALLOYSITE CATALYST

(75) Inventor: Sung-Il Kim, Seoul (KR)

(73) Assignee: Korea PTG Co., Ltd., Ulsan (KR)

( * ) Notice: Subject to any disclaimer, the term of this patent is extended or adjusted under 35 U.S.C. 154(b) by 0 days.

(21) Appl. No.: 09/341,141

(22) PCT Filed: Jan. 17, 1997

(86) PCT No.: PCT/KR97/00008

§ 371 Date: Jul. 15, 1999

§ 102(e) Date: Jul. 15, 1999

(87) PCT Pub. No.: WO98/31724

PCT Pub. Date: Jul. 23, 1998

(51) Int. Cl.[7] ............ C08G 65/10; C08G 65/20
(52) U.S. Cl. ............ 528/365; 528/363; 528/271; 528/272; 528/274; 528/275; 528/408; 528/409; 528/416
(58) Field of Search .................. 528/365, 363, 528/271, 272, 274, 275, 416, 408, 409

(56) References Cited

U.S. PATENT DOCUMENTS

| | | | | |
|---|---|---|---|---|
| 3,433,829 | * | 3/1969 | Durfelt | 528/409 |
| 4,189,566 | * | 1/1981 | Mueller | 528/409 |
| 4,243,799 | * | 2/1980 | Mueller | 528/408 |

FOREIGN PATENT DOCUMENTS

| | | |
|---|---|---|
| 2760272 U | 10/1977 | (DE) . |
| 2916653 U | 11/1980 | (DE) . |
| 0038009 | 10/1981 | (EP) . |
| 0185553 | 5/1990 | (EP) . |
| 877269 | 9/1961 | (GB) . |
| 4-277522 | 10/1992 | (JP) . |
| 4-306228 | 10/1992 | (JP) . |
| WO94/05719 | 3/1994 | (WO) . |
| WO94/26803 | 11/1994 | (WO) . |

OTHER PUBLICATIONS

H. Meerwein et al., "Die Polymerisation des Tetrahydrofurans", Angeu. Chem. No. 24, Dec. 21, 1960, pp. 927–934.

Jurgen Falbe et al., "Rompp Chemie Lexikon", Georg Thieme Verlag, p. 1713.

P. Dreyfuss, "Poly (Tetrahydrofuran)", Gordon and Breach Science Publishers, 1982, pp. 1–69.

* cited by examiner

*Primary Examiner*—P. Hampton Hightower
(74) *Attorney, Agent, or Firm*—Jacobson, Price, Holman & Stern, PLLC

(57) ABSTRACT

An improved process for Polytetramethylene-Ether-Glycol-Diesters of the formula $R-CO-O(CH_2-CH_2-CH_2-CH_2-O)n-COR^1$, in which R and $R^1$ are identical or different and are alkyl radicals or derivatives thereof, by polymerization of tetrahydrofuran in the presence of a heterogeneous polymerization catalyst and in the presence of a carboxylic anhydride. The use of aluminum silicate catalyst composed of acid-activated and calcinated natural halloysite instead of the known catalytic silicates as bentonite, zeolite or kaolinite. The new catalyst with a very long lifetime produces polymers having more uniform properties and narrow molecular weight distribution even with a relative impure monomer.

14 Claims, 1 Drawing Sheet

PROCESS FOR PRODUCTION OF POLYTETRAMETHYLENE-ETHER-GLYCOL-DIESTER USING HALLOYSITE CATALYST

FIELD OF THE INVENTION

The invention relates to a process for the preparation of polytetramethylene-Ether-Glycol (PTMEG) Diesters by polymerization of tetrahydrofuran (THF) in the presence of a carboxylic anhydride by means of a catalyst, which is a acid-activated by the treatment of acid or ammonium chloride or sequential treatment with acid and ammonium chloride, and calcinated halloysite instead of bentonite, zeolite or kaolinite. The formula of the polymer is R—CO—O($CH_2$—$CH_2$—$CH_2$—$CH_2$—O)n-$COR^1$, in which R and $R^1$ are identical or different and are alkyl radicals.

BACKGROUND ART

The polymerization of THF by oxonium ion catalysis became known as the result of the basic work by H. Meerwein et al (Angew, Chemie 72, (1960), 972) and is described comprehensively in the monograph "Polytetrahydrofuran" by P. Dreyfuss, Gordon and Breach Sc. Publishers, New York, London, Paris 1982.

U.S. Pat. Nos. 3,433,829, 4,189,566 and 4,243,799 describe the polymerization of specially purified THF in the presence of a carboxylic anhydride and bleaching earth, which is a naturally occurring aluminum silicates having a cryptocrystalline three layer structure of the montmorillonite mineral. The mineral obtained from deposits exhibits physical and chemical properties which vary depending on the origin. In the international PCT-Application WO 94/05719 an improved process is described by catalysts selected from synthetic amorphous aluminum silicate, acid-activated and calcinated kaolin or zeolite in the presence of carboxylic anhydride. Similar procedures are described in the JP-Applications 4-306228, 4-277522 and the U.S. Pat. Nos. 5,208,385 and 5,210,283 with synthetic mainly amorphous silica-alumina. In particular, the activity of the catalyst is not constant, but instead varies from batch to batch. This is a serious disadvantage for commercial utilization of these catalysts. Besides, only very pure THF can be polymerized.

DISCLOSURE OF THE INVENTION

Figure 1:
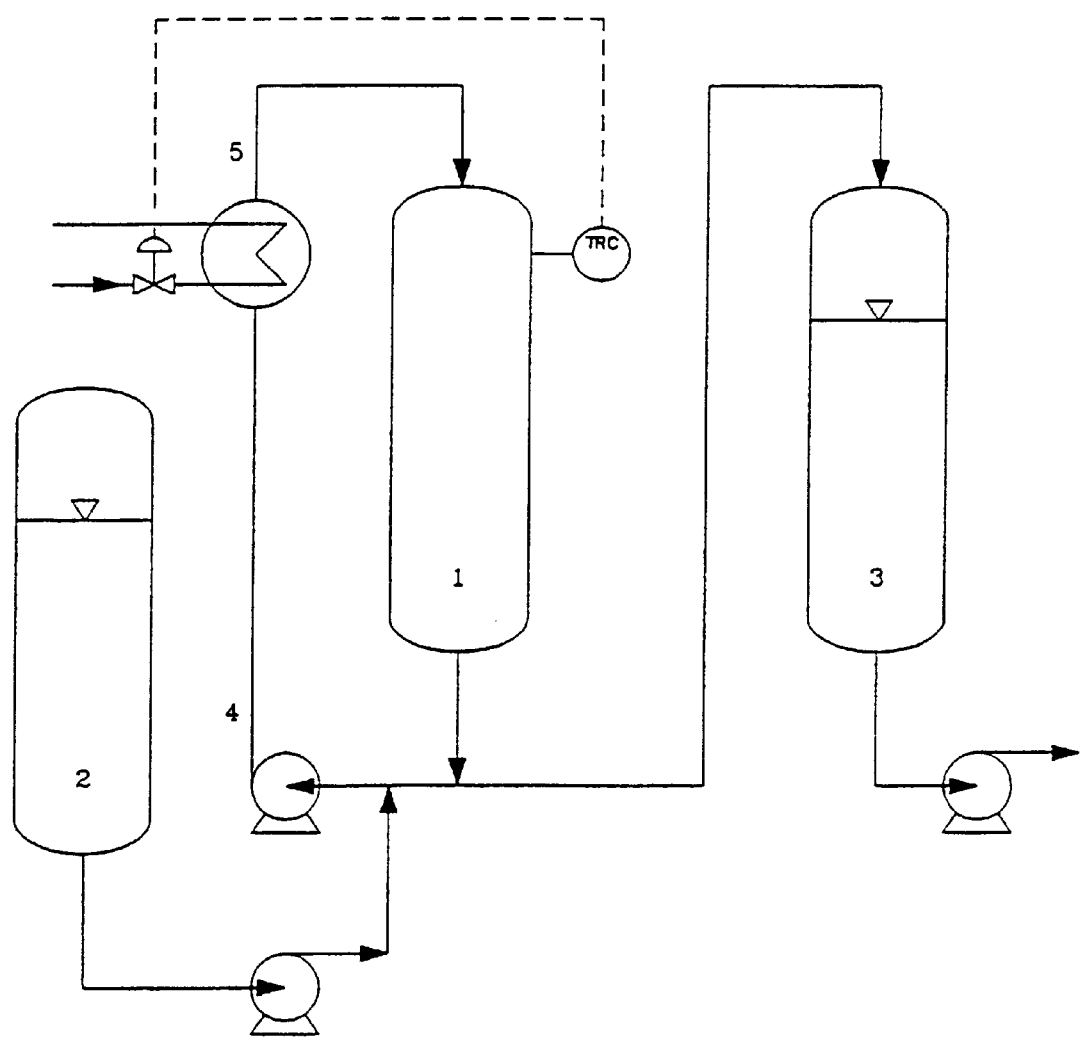
FIG. 1 shows an apparatus for the polymerization process according to the present invention.

The present invention has the object of simplifying the polymerization of THF with respect to the industrial embodiment and making it reproducible. In the new process normal impurities in THF as methacrolein, dihydrofuran (2,3- and 2,5-), propionaldehyde and butyraldehyde are no longer harmful for the polymerization or the quality (color) or for the color of the polymer. Therefore, it is no longer necessary to subject the THF to a special purification as for instant hydrogenation (U.S. Pat. No. 4,257,961) or treatment with strong acids (U.S. Pat. No. 4,189,566). The advantages of the process described in German Patent 29 16 653, in particular the fixed-bed catalysis, should be retained also with the halloysite catalyst.

This object is achieved by a process for the preparation of polytetramethylene ether glycol diesters having the formula in which R and $R^1$ are identical or different and are alkyl radicals having 1–4 carbon atoms, and n is an integer from 2 to 200, by polymerization of THF in the presence of a polymerization catalyst and in the presence of carboxylic anhydride, characterized in that a aforesaid acid-activated and calcinated halloysite is used.

It has been found, surprisingly, that this special catalyst which has been pressed to give moldings and is suspended or introduced into a stationary, fixed catalyst bed converts a mixture of THF and carboxylic anhydride into PTMEG dicarboxylates of low color index at a high polymerization rate reproducibly and over unusually long periods without the need to subject the THF to pretreatment with highly acidic substances or hydrogenation, as it is unavoidable when bleaching earth or other catalysts are used. Furthermore this new catalyst is suitable for the successful polymerization of contaminated THF by substances with carbonyl groups as for instance ketones, aldehydes or esters and olefins. These impurities can be tolerated up to a concentration of 1.5 wt %. Such a low quality monomer is useless for catalysts as kaolin, zeolites or synthetic aluminum silicates and montmorillonite.

The content of crown ether impurities is extremely low or almost zero in the process according to the invention. The special catalysts have a virtually unlimited service life and thus improve the environmental acceptability of the process.

Broenstedt and Lewis acids are the acidic centers which are preferably formed after treatment with $NH_4Cl$-solution and calcination in accordance with the equations.

Calcination

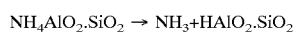

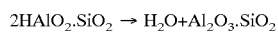

It is also possible to form these acetic centers by treatment with mineral acid and washing by water and drying.

By the acid-activation, in sequential treatment with acid, ammonium chloride and calcination, the strength of acidic centers and pore size of catalyst can be controlled. It is preference of this invention to acidify the halloysite catalyst by means of aforesaid sequential treatment.

Compared with naturally occurring bleaching earth, kaolin, mixtures of montmorillonite and synthetic amorphous aluminum silicates, and zeolites and kaolins, the new catalyst has the considerable advantage that the catalytic activity and selectivity of the strength of the acidic centers, both can be controlled by aforesaid sequential treatment of the halloysite.

It is preferred to acidify the halloysite as a powder and convert it then into a paste, which can be extruded to give pellets or beads having a diameter of, for example, 4 mm. In most cases the catalysts have a specific surface area of 500–600 $m^2$/g, a pore volume of about 0.5 $cm^3$/g and a mean pore radius of about 50 Å.

Compared to hitherto known aluminum silicate catalysts, the new catalysts of this invention have the considerable advantage that the catalyst activity can be adjusted under the control of the sequential acid-activation and calcination process. The catalysts are crystalline, hydrated aluminum silicates, with skeleton structure. Halloysite can be described by the empirical formula; $Al_4[(OH)_8/Si_4O_{10}].4H_2O$ ("Roempp Chemie Lexicon", Stuttgart, New York, 1995). At 50° C., it looses its water content. This mineral is widespread all over the earth.

The catalysts to be used in the process according to the invention are preferably calcinated, just before use, by heat treatment for from 0.1 to 10 hours, more preferably from 0.5 to 16 hours, at from 200° C. to 800° C. This measure reduces the water content and increases the reactivity. The water content of the catalysts should preferably be less than 1% by weight.

Moldings used according to the invention in a fixed bed are obtained by washing halloysite powder eventually after acid-activation and transformation in the form of a paste, which is extruded to give pellets, beads, rings or tablets.

The moldings employed in the fixed catalyst bed can have, for example, the shape of balls, rings, cylinders or tablets. Spherical moldings can have diameters of 2–15 mm, preferably 3–5 mm. As cylindrical moldings, cylinders having a length of 2–6 mm are generally used. Non-spherical or non-cylindrical moldings generally have a volume which corresponds to that of the cylindrical moldings.

For the polymerization of THF, only a small amount of catalyst is required. The dry catalyst moldings are poured into a reactor, for example a tube furnace or shaft furnace. The bed dimensions selected are preferably determined by the need to dissipate the heat of polymerization. It may also be useful to pump all or some of the reaction product over the bed in a circuit in order to ensure isothermal reaction conditions along the furnace in a heat exchanger by cooling or warming. In general, a circulation flow rate about 3–10 times the reactor volume per hour is sufficient. In the case of continuous polymerization, 0.01–0.1 times the hourly circulation flow rate is produced while same quantity of fresh feed as THF and carboxylic anhydride is fed to the reaction system.

Another suitable reactor for the polymerization according to the invention is a rotating basket filled with catalyst moldings which is located in a thermostable reactor which may additionally be equipped with stirring paddle.

It was unexpected and a technical advance compared with the procedure known hitherto, as described, for example, in German Patent 29 16 653, or the PCT-Application WO 94/05719, that the process according to the invention gives products having a still narrower molecular weight distribution and a negligibly small content of less than 0.05% by weight of crown ether impurities. Therefore the products according to this invention are suitable to be used in medicine applications.

While commercially available polytetramethylene ether glycol (PTMEG) having a molecular weight of 1000 is characterized by the polydispersity Mw/Mn of from 1.5 to 1.8, a product is formed according to the invention having the polydispersity Mw/Mn of from 1.2 to 1.4. This is particularly suitable for the production of elastic polyurethane fibers or thermoplastic polyurethanes having good low-temperature behavior.

It was very surprising that even in the case in which THF of low quality has to be employed, the life expectancy of the catalysts is more than 2 or 3 years. It may be favorable for example to admix the new catalysts with an addition of 1–10% by weight of a pre-activated palladium catalyst at the atmosphere of hydrogen. An example of a catalyst which is suitable for this purpose is HD-101, 0.5 wt % Pd on $Al_2O_3$ pellet, from N.E. Chemcat corp., Japan.

The essentially anhydrous new catalyst does not develop a catalytic action until it is in the presence of the promoter carboxylic anhydride. It is advantageous to use carboxylic anhydrides derived from aliphatic or aromatic poly and/or preferably monocarboxylic acids having 2–12, preferably 2–8, carbon atoms. Examples which may be mentioned are acetic anhydride, propionic anhydride, butyric anhydride or acrylic or methacrylic anhydride, and succinic anhydride. It is also possible to use mixed anhydrides and anhydride mixtures. Merely for price reasons, preference is given to acetic anhydride.

As mentioned above, the process according to the invention can be used to prepare diesters of PTMEG of any desired degree of polymerization. The carboxylic anhydride concentration of polymerization mixture determines the degree of polymerization. The lower the anhydride concentration, the higher the molecular weights, and vice versa. The following data may serve as guide values for a reaction temperature of 50° C.

| Degree of polymerization | 8 | 9 | 10 | 24 |
|---|---|---|---|---|
| % by weight of acetic anhydride in the polymerization batch | 10 | 8.5 | 6.3 | 3 |

In order to carry out the polymerization, the catalyst moldings are brought into contact with the reaction mixture, for example by pumping, in a suitable reaction vessel, for example in the absence of a gas phase by the so-called pool procedure in the preferred embodiment of the polymerization. The heat of reaction formed during the polymerization is dissipated in a suitable manner. In the simplest embodiment of the process according to the invention, the catalyst bed can also be covered by the polymerization mixture and the reaction carried out, for example adiabatically. In the case of very active catalysts, boiling THF limits the maximum temperature to about 65° C., when the reaction is complete after 30–60 minutes.

In general, the polymerization is carried out at pressures between 0 and 25 bar and at temperatures between 10° C. and 60° C. Lower or higher pressures and temperatures bring no advantages.

In most case, the polymerization is allowed to proceed to complete conversion of the carboxylic anhydride. Depending on the polymerization temperature, 40–75% by weight of the THF employed have then reacted if the polymerization was carried out in the range from 30° C. to 55° C. Unreacted THF is re-isolated during distillative work-up of the reaction product and be re-used for later polymerization without disadvantages.

The PTMEG diesters obtained by the process according to the invention can be hydrolyzed by known methods or alternatively transesterified, for example by the method of U.S. Pat. No. 2,499,725 using, for example, methanol.

Hydrogenating transesterification, as described in U.S. Pat. No. 4,608,422 is particularly advisable for performance of the process on a large scale. Further methods are described in German Patent 27 60 272, European Patent 0 185 553 and European Patent 0 038 009. The simplest method is to convert the diesters into the diol form by the method, introduced by Adkins, of ester hydrogenation using copper/chromiun oxide catalysts. Suitable catalysts are available, for example the copper chromite catalyst G 22 containing about 11% of barium, from Suedchemie AG, Munich, which converts the diesters into PTMEG without losses at 220° C. and a hydrogen pressure of 250 bar without a solvent or alternatively in the presence of methanol or ethanol. This PTMEG, having, for example, molecular weights of 800–3000, is then suitable for the preparation of polyesters or polyurethanes. Only the products obtained by the process according to the invention can be hydrogenated by the Adkins method to give products of sufficiently low residual saponification number of lower than 1 mg KOH/g. PTMEG cliacetates prepared by other polymerization methods (for example by bleaching-earth catalysis) give PTMEG having residual saponification numbers of greater than 1 mg KOH/g. This is the reason, that the new PTMEG generates polymers of very high quality, higher than hitherto known.

The examples below are intended to illustrate the process according to the invention in greater detail without representing a limitation. Parts are by weight; they have the same relationship to parts by volume as does the kilogram to the liter.

EXAMPLE 1

The Halloysite, originated Korea, was treated by 5 wt % HCl during 30 minutes and filtered out filtrate and was rinsed by the distilled water. Preceding acid treatment was repeated three times. Again, as the same manner as acid treatment, the Halloysite was treated by 10 wt % $NH_4Cl$ solution during 15 minutes and filtered out filtrate and was rinsed by the distilled water. Ammonium chloride treatment was also repeated three times. The wetted paste was shaped into beads in diameter of 4 mm and was calcinated at 750° C. for 10 hours and naturally cooled at desiccator. To the laboratory reactor equipped with agitator and temperature controller, charged catalyst in volume of 150 cm³ and preheated to 50° C., and then fed 600 grams of mixture of 91.96 wt % THF and 8.04 wt % acetic anhydride. The mixture was polymerized during 4 hours with agitation in 10 rpm at 50° C. After separating the catalyst, it was confirmed that 99 wt % acetic anhydride was converted to PTMEG diacetate by the analysis.

Upon evaporation of unreacted THF at 150° C. and 5 mbar Abs., PTMEG diacetate residue was 54 wt % and saponification number of which was 130.8 mgKOH/g that was corresponding to an average molecular weight of 858 g/mole. PTMEG diacetate was mixed with the same volume of methanol and was transesterified in the presence of 0.01 wt % sodium methoxide. PTMEG diacetate was converted to PTMEG having hydroxyl number of 145 mgKOH/g which was corresponding to average molecular weight of 774 g/mole. The color index was APHA 5. After evaporation of methanol and oligomer at 200° C. and 1 mbar Abs., Polydispersity Mw/Mn was as low as 1.35, and the content of oligomeric cyclic ether was less than 0.01 wt %.

EXAMPLE 2

THF was polymerized in the presence of acetic anhydride contaminated by 700 ppm of ethyl acetate and the catalyst prepared by the same method as in example 1. Average molecular weights of PTMEG diacetate and PTMEG, color index and polydispersity were same.

EXAMPLE 3

The polymerization was carried out in an apparatus as shown in the FIG. 1. The halloysite catalyst acid-activated by means of sequential acid, ammonium chloride and calcination prepared by the same method as in Example 1, were introduced into reaction tube (1), provided with a temperature controlled external heat exchanger (5) and having a capacity of 5000 parts by volume and a diameter to length ratio of about 1: 5. The stock vessel (2) having a useful volume of 4000 parts by volume was charged with commercial technical grade THF (200 ppm 2,3- and 2,5-dihydrofuran, and 200 ppm butyraldehyde respectively) with 3.75 wt % acetic anhydride. This mixture was charged onto the catalyst bed (1), which was kept at 43° C. As soon as the catalyst bed had been filled with the fresh feed, which was continuously circulated with the circulation pump (4) over the catalyst (1) at a pumping rate of 15,000 parts/h, from the stock vessel (2) fresh feed was charged at an hourly rate of 150 parts. The same quantity of polymer mixture was gathered in the storage vessel (3), which was composed of 62 wt % of PTMEG-diacetate having an saponification number of 66.7 mgKOH/g which was corresponding to average molecular weight of 1682 g/mole. PTMEG-diacetate was transesterified by the same method as in Example 1, and the hydroxyl number of PTMEG was 70.1 mgKOH/g, which was corresponding to average molecular weight of 1601 g/mole. After evaporation of methanol and oligomer at 200° C. and 1 mbar Abs., polydispersity was 1.5 and crown ether was not detectable.

EXAMPLE 4

Polymerization of commercial technical grade THF mixture with 6.3 wt % of acetic anhydride, in the presence of same catalyst and reaction apparatus as in Example 3, was carried out at the same conditions as in Example 3 but at 50° C. 58 wt % of THF was converted to PTMEG-diacetate having a saponification number of 120.2 mgKOH/g which was corresponding to average molecular weight of 933 g/mole. By the transesterification of PTMEG diacetate, PTMEG having hydroxyl number of 131.9 mgKOH/g which was corresponding to average molecular weight of 851 g/mole, and color index being less than APHA 5 was obtained. After evaporation of methanol and oilgomer at 200° C. and 1 mbar Abs., polydispersity was 1.32 and crown ether was not detectable.

What is claimed is:

1. A process for the preparation of a polytetramethylene ether glycol diester of the formula

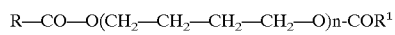

$$R\text{—}CO\text{—}O(CH_2\text{—}CH_2\text{—}CH_2\text{—}CH_2\text{—}O)n\text{-}COR^1$$

wherein

R and $R^1$ are identical or different alkyl radicals having 1–4 carbon atoms; and n is an integer from 2 to 200, by polymerization of tetrahydrofuran in the presence of a polymerization catalyst and in the presence of a carboxylic anhydride, wherein said catalyst is halloysite mineral activated by acid treatment and calcined.

2. A process according to claim 1, wherein said acid is HCl.

3. A process according to claim 1, wherein said catalyst is halloysite mineral further activated by treatment of ammonium chloride before calcination.

4. A process for the preparation of polytetramethylene ether glycol diester of the formula

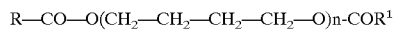

$$R\text{—}CO\text{—}O(CH_2\text{—}CH_2\text{—}CH_2\text{—}CH_2\text{—}O)n\text{-}COR^1$$

wherein

R and $R^1$ are identical or different alkyl radicals having 1–4 carbon atoms; and n is an integer from 2 to 200, by polymerization of tetrahydrofuran in the presence of a polymerization catalyst and in the presence of a carboxylic anhydride, wherein said catalyst is halloysite mineral activated by ammonium chloride treatment and calcined.

5. A process according to claim 1, wherein said carboxylic anhydride is acetic anhydride.

6. A process according to claim 1, wherein said catalyst further includes a metal selected from the 8th group of the Periodic Table of the Elements which causes catalytic hydrogenation in a concentration of from 1 to 10% by weight, and a reaction intermediate is saturated with hydrogen at atmospheric pressure or superatmospheric pressure during the polymerization.

7. A process according to claim 1, wherein said catalyst is calcinated just before use, by thermal treatment at from 200° C. to 800° C. for 0.5 to 16 hours.

8. A process according to claim 1, wherein said catalyst is arranged in a fixed bed, and a mixture of tetrahydrofuran and carboxylic anhydride is passed over the fixed bed.

9. A process according to claim 1 to 8, wherein said catalyst is in the form of beads, rings, tablets, cylinders or granules having a diameter of 1–8 mm.

10. A process according to claim 4, wherein said carboxylic anhydride is acetic anhydride.

11. A process according to claim 4, wherein said catalyst further includes a metal selected from the $8^{th}$ group of the Periodic Table of the Elements which causes catalytic hydrogenation in a concentration of from 1 to 10% by weight, and a reaction intermediate is saturated with hydrogen at atmospheric pressure of superatmospheric pressure during the polymerization.

12. A process according to claim 4, wherein said catalyst is calcined just before use by thermal treatment at from 200° C. to 800° C. for from 0.5 to 16 hours.

13. A process according to claim 4, wherein said catalyst is arranged in a fixed bed, and a mixture of tetrahydrofuran and carboxylic anhydride is passed over the fixed bed.

14. A process according to claim 4, wherein said catalyst is in the form of beads, rings, tablets, cylinders or granules having a diameter of from 1 to 8 mm.

* * * * *